United States Patent
Thom et al.

(10) Patent No.: US 12,344,175 B2
(45) Date of Patent: Jul. 1, 2025

(54) STEERING COLUMN MODULE FOR ATTACHMENT TO A STEERING COLUMN OF A MOTOR VEHICLE, AND METHOD FOR CHECKING A STEERING COLUMN MODULE

(71) Applicant: Valeo Schalter und Sensoren GmbH, Bietigheim-Bissingen (DE)

(72) Inventors: Jens Thom, Bietigheim-Bissingen (DE); Reinhard Mahler, Bietigheim-Bissingen (DE)

(73) Assignee: Valeo Schalter und Sensoren GmbH

( * ) Notice: Subject to any disclaimer, the term of this patent is extended or adjusted under 35 U.S.C. 154(b) by 0 days.

(21) Appl. No.: 18/273,630

(22) PCT Filed: Jan. 13, 2022

(86) PCT No.: PCT/EP2022/050632
§ 371 (c)(1),
(2) Date: Jul. 21, 2023

(87) PCT Pub. No.: WO2022/157068
PCT Pub. Date: Jul. 28, 2022

(65) Prior Publication Data
US 2024/0300428 A1   Sep. 12, 2024

(30) Foreign Application Priority Data
Jan. 21, 2021   (DE) .................... 10 2021 101 183.3

(51) Int. Cl.
*B60R 16/027*   (2006.01)
*G06T 7/00*   (2017.01)

(52) U.S. Cl.
CPC .......... *B60R 16/027* (2013.01); *G06T 7/0004* (2013.01); *G06T 2207/30108* (2013.01)

(58) Field of Classification Search
CPC .................. B60R 16/027; B60R 16/02; G06T 2207/30108; H01R 13/501; H01R 35/04; H01R 43/20; B62D 1/16
See application file for complete search history.

(56) References Cited

U.S. PATENT DOCUMENTS 5,785,541 A * 7/1998 Best ...................... B60R 16/027
439/15
2001/0016059 A1* 8/2001 Krahn ................. G01N 21/9508
382/141

FOREIGN PATENT DOCUMENTS

DE          4431719 A1      3/1996
DE      102006056503 A1     6/2008
(Continued)

OTHER PUBLICATIONS

JP-2006334272-A Machine English Translation (Year: 2006).*
(Continued)

*Primary Examiner* — Jason D Shanske
*Assistant Examiner* — Matthew James O'Neill
(74) *Attorney, Agent, or Firm* — Osha Bergman Watanabe & Burton LLP

(57) ABSTRACT

A steering column module for a steering column of a motor vehicle is disclosed. The module has a first housing part and a second housing part, which, when the module is in a target installed position, is rotatable in opposite directions relative to the first housing part from a starting position, in each case by at least one complete revolution. An electric line is coupled to both housing parts and is received, wound in a spiral form, in the steering column module. An adhesive seal marks a correct orientation of the two housing parts, regions of the adhesive seal being connected to the housing parts. When the adhesive seal is severed, means on the housing (Continued)

parts cause a free edge of one of the regions to protrude in the radial direction beyond a free edge of the other region.

12 Claims, 4 Drawing Sheets

(56) References Cited

FOREIGN PATENT DOCUMENTS

| | | | |
|---|---|---|---|
| DE | 102007055392 A1 | 5/2009 | |
| DE | 102013008688 A1 | 11/2014 | |
| DE | 102014113871 A1 | 3/2016 | |
| EP | 0786162 B1 | 5/1998 | |
| GB | 2073961 A * | 10/1981 | ........... B60R 16/027 |
| JP | 2006334272 A * | 12/2006 | |
| JP | 2008-30713 A | 2/2008 | |

OTHER PUBLICATIONS

International Search Report and Written Opinion in corresponding International Application No. PCT/EP2022/050632, dated Apr. 19, 2022 (16 pages).

German Search Report issued in German Application No. 10 2021 101 183.3 mailed on Jul. 19, 2021 (5 pages).

* cited by examiner

STEERING COLUMN MODULE FOR ATTACHMENT TO A STEERING COLUMN OF A MOTOR VEHICLE, AND METHOD FOR CHECKING A STEERING COLUMN MODULE

The invention relates to a steering column module for attachment to a steering column of a motor vehicle, which has a first housing part and a second housing part. In a desired installation position of the steering column module, in which the steering column module is attached to the steering column, the second housing part can be rotated around a rotation axis of the steering column module from a starting position in relation to the first housing part by at least one complete revolution both in a first direction and in a second direction which is opposite to the first direction. The steering column module comprises an electrical line, which is coupled to both housing parts and is received in the steering column module in a manner wound spirally around the rotation axis. The invention also relates to a method for checking such a steering column module.

A steering column module of the type mentioned at the outset is described, for example, in DE 10 2013 008 688 A1.

If a steering column module of this kind is delivered to a motor vehicle manufacturer, for example, it is expedient to indicate that the two housing parts are in a correct orientation, which corresponds to the desired installation position, relative to one another. If the two housing parts are correctly oriented in relation to one another, the second housing part can be rotated relative to the first housing part from the starting position around the rotation axis by an angle of rotation that is of substantially the same magnitude in the first direction as in the second direction. During rotation in the first direction, the spirally wound line is unwound a little, and when the second housing part is rotated in relation to the first housing part around the rotation axis in the second direction, the spirally wound line is wound further. Such unwinding of the spirally arranged electrical line is naturally limited (as is the winding). It is therefore important to ensure that, when the steering column module is delivered, the two housing parts are in the correct orientation relative to one another, this orientation corresponding to the orientation of the housing parts in the desired installation position.

In order to indicate, for example after the manufacture and technical inspection of the steering column module or upon delivery of the inspected steering column module to the motor vehicle manufacturer, that the two housing parts are in the correct orientation relative to one another, an adhesive seal can be attached to the steering column module. In this case, a first subregion of the adhesive seal is connected to the first housing part, and a second subregion of the adhesive seal is connected to the second housing part. The correct orientation of the housing parts is then indicated by the adhesive seal.

However, the situation may occur that, following the manufacture and technical inspection of the steering column module and following the attachment of the adhesive seal to the steering column module, the two housing parts are once again separated from one another or are detached from one another. This also leads to separation of the adhesive seal into the two subregions or to corresponding tearing of the adhesive seal. If the two housing parts are then coupled to one another in a rotationally fixed manner, for example for transporting the steering column module, the situation may occur that the two subregions of the separated adhesive seal are oriented in relation to one another again in the same way as was the case before the adhesive seal was separated into the two subregions or parts.

And in this case the situation may arise that the second housing part was accidentally rotated in relation to the first housing part beforehand by a complete revolution, that is to say by a rotation of 360°, around the rotation axis. If a steering column module of this kind is attached to the steering column of the motor vehicle or mounted on the steering column, the two housing parts are no longer in the correct orientation relative to one another. The correct orientation of the housing parts relative to one another allows the second housing part to be rotated in relation to the first housing part by substantially equal angular amounts in the two directions. However, if the second housing part has already accidentally been rotated by a complete revolution in relation to the first housing part, this is no longer the case. This is unfavorable.

Therefore, it is expedient to check the integrity of the adhesive seal before installing the steering column module, that is to say before attaching the steering column module to the steering column of the motor vehicle.

It has proven to be comparatively difficult to reliably and easily determine damage to the adhesive seal or integrity of the adhesive seal. This applies in particular if the integrity of the adhesive seal is to be determined automatically, that is to say by evaluating images recorded by means of a camera for example.

The object of the present invention is therefore to provide a steering column module of the type mentioned at the outset, in which a correct orientation of the housing parts relative to one another can be determined in a particularly simple manner, and to specify a corresponding method for checking a steering column module.

This object is achieved by a steering column module having the features of patent claim 1 and by a method having the features of patent claim 10. Advantageous refinements together with expedient developments of the invention are specified in the dependent patent claims and in the following description.

The steering column module according to the invention for attachment to a steering column of a motor vehicle comprises a first housing part and a second housing part. In a desired installation position of the steering column module, in which the steering column module is attached to the steering column of the motor vehicle, the second housing part can be rotated around a rotation axis of the steering column module from a starting position in relation to the first housing part by at least one complete revolution both in a first direction and in a second direction which is opposite to the first direction. In other words, it is possible in the desired installation position of the steering column module to rotate the second housing part around the rotation axis of the steering column module from the starting position by at least one complete revolution in the first direction. And it is also possible in the desired installation position of the steering column module to rotate the second housing part from the starting position by at least one complete revolution in the second direction. An electrical line of the steering column module is coupled to the two housing parts and is received in the steering column module in a manner spirally wound around the rotation axis. The steering column module also has an adhesive seal for identifying a correct orientation, which corresponds to the desired installation position, of the two housing parts relative to one another. In this case, a first subregion of the adhesive seal is connected to the first housing part, and a second subregion of the adhesive seal is connected to the second housing part. Means are formed on at least one of the two housing parts, which means cause a free edge of one of the subregions of the adhesive seal to protrude over a free edge of the other subregion of the adhesive seal in the radial direction when the adhesive seal is separated into the two subregions Such protrusion or projection of the free edge of one of the subregions over the free edge of the other of the subregions leads to it being possible to optically detect separation of the adhesive seal into the two subregions in a very simple and reliable manner. However, if such separation of the adhesive seal occurs, it can be concluded that the steering column module was undesirably manipulated after the adhesive seal had been attached to the housing parts. When such a manipulation of the steering column module has taken place, a check can be made to determine whether the two housing parts are still in the correct orientation relative to one another, that is to say are in the orientation that allows the rotation of the second housing part in relation to the first housing part around the rotation axis through angles of substantially the same magnitude, or whether this is not the case.

The fact that the housing parts are correctly oriented relative to one another can be deduced from the integrity of the adhesive seal. If, on the other hand, the adhesive seal is separated into the two subregions, the two housing parts can still be correctly oriented relative to one another. However, it is also possible that the two housing parts were not returned to the correct orientation relative to one another after the adhesive seal was torn. And the latter can easily be determined before installing the steering column module, that is to say before attaching the steering column module to the steering column of the motor vehicle. However, such a check only needs to be carried out when the adhesive seal is not intact or the adhesive seal is separated into the two subregions. Consequently, the correct orientation of the housing parts relative to one another can be determined in a particularly simple manner, namely based on the integrity of the adhesive seal.

And only in the case of lack of integrity or damage to the adhesive seal (which rarely occurs in practice) is it advisable to check the orientation of the housing parts. Therefore, the effort associated with such a rather rare check is low.

The means formed on at least one of the two housing parts ensure that any separation of the adhesive seal into the two subregions can be identified particularly easily. Since the two subregions are spaced apart from one another in the radial direction of the steering column module in the region of their free edges due to the provision of the means on at least one of the two housing parts, separation of the adhesive seal in this way into the two subregions can be determined or identified very easily and reliably.

Such protrusion of the free edge of one of the subregions over the free edge of the other of the subregions in the radial direction can be readily and easily determined, in particular in an automated manner, that is to say by evaluating an image recorded by means of a camera, for example. In particular, an undesired manipulation of the steering column module with regard to a deviation in the orientation of the two housing parts from their correct orientation, which corresponds to the desired installation position, can be easily identified in this way.

This is based on the finding that if, after the adhesive seal has been separated, the two subregions are in the same plane without there being a radial distance between the free edges of the subregions, identification of the torn adhesive seal or the adhesive seal separated into the two subregions can be realized only with comparative difficulty. However, in the present case, the radial distance between the two free edges of the subregions ensures that the torn adhesive seal or the adhesive seal separated into the two subregions stands out with a good contrast from a background which is located behind the adhesive seal and is provided by at least one of the housing parts. This is beneficial for optical identification of the separation of the two adhesive seals into the two subregions.

The means are preferably provided by way of an outer side of one of the two housing parts protruding over an outer side of the other of the two housing parts in the radial direction at least in the region of one of the free edges of the adhesive seal. Therefore, if there is a radial height difference between the outer sides of the two housing parts in the region of one of the free edges of the adhesive seal, for example owing to the provision of a step on one of the two housing parts, then the separation of the adhesive seal into the two subregions ensures that a distance is formed between the free edges of the subregions in the radial direction. This is due to the inherent rigidity of the material used for the adhesive seal, which may be, for example, an adhesive film, that is to say a film coated with an adhesive at least in regions.

In addition or as an alternative, the means can be provided by a ramp, which is formed on one of the two housing parts at least in the region of the adhesive seal. In this case, one of the subregions of the adhesive seal is in contact with a top side of the ramp, which top side is oriented in a manner inclined with respect to the rotation axis. A ramp of this kind can be used in a particularly effective manner to straighten that subregion of the adhesive seal which is connected to the top side of the ramp, which top side is oriented in an inclined manner. This is because if the adhesive seal has not yet been separated or torn, the adhesive seal has a bend at a free end or at an edge of the ramp. This bend assists with the subregion of the adhesive seal being lifted off in the radial direction and therefore with the free edge of the subregion connected to the top side of the ramp protruding over the free edge of the other subregion of the adhesive seal in the radial direction.

Provision can be made for a free end or an edge of the ramp to protrude outward over an edge of the other of the two housing parts in the radial direction. The adhesive seal can be attached particularly easily to the top side of a ramp designed in this way in order to achieve the situation that the respective subregions of the adhesive seal are connected to the respective housing parts.

As an alternative, a free end of the ramp can be closer to the rotation axis than an edge of the other of the two housing parts. A configuration of the ramp in this way is advantageous with regard to the fact that the ramp does not take up any additional installation space in the radial direction as a result. This is due to the fact that the ramp does not protrude outward in the radial direction, but rather the top side of the ramp is oriented in a manner inclined inward toward the rotation axis and therefore the ramp slopes down toward the free end and does not rise. This is advantageous with regard to installation of the steering column module, that is to say attachment of the steering column module to the steering column of the motor vehicle. This is because the installation space available is usually comparatively small in the case of installation of this kind. It is therefore advantageous for this type of installation for as little installation space as possible to be taken up by the steering column module.

The adhesive seal preferably has a predetermined breaking line along which the adhesive seal can be separated into the two subregions. In this case, a section, which adjoins the predetermined breaking line, of at least one of the subregions is free of an adhesive, by means of which the respective subregion of the adhesive seal is held on the corresponding housing part. Keeping the at least one section, which adjoins the predetermined breaking line, of the adhesive seal free of adhesive assists with one of the subregions being radially lifted off as a result of the separation or tearing of the adhesive seal along the predetermined breaking line, that is to say with the free edge of one of the subregions protruding over the free edge of the other of the subregions in the radial direction.

If both subregions are free of adhesive in the section adjoining the predetermined breaking line, this facilitates the protrusion of the free edge of one of the two subregions over the free edge of the other subregion in the radial direction as a result of the separation of the adhesive seal in a very simple manner.

In particular, if the means formed on at least one of the two housing parts comprise the ramp, provision is preferably made for the section, which adjoins the predetermined breaking line, of the subregion to be free of the adhesive at least on the other of the two housing parts. This is because the subregion, which is connected to the top side of the ramp, of the adhesive seal can then be particularly readily detached from the other subregion and therefore protrude over the free edge of this other subregion in the radial direction.

The two housing parts are preferably coupled to one another in a rotationally fixed manner in a transportation state of the steering column module, in which a distance between the housing parts in the direction of the rotation axis is smaller than in the desired installation position of the steering column module. This ensures that there is no tearing or such damage or separation of the adhesive seal due to movements of the housing parts relative to one another.

In particular, the two housing parts can be latched to one another in a rotationally fixed manner in the transportation state of the steering column module. Such a latching connection enables the housing parts to be easily coupled to one another and also allows the housing parts to be easily detached from one another by unlatching corresponding latching elements formed on the housing parts.

The steering column module can comprise a sensor device for detecting rotation of a steering shaft of the steering column around the rotation axis. If the steering column module has a sensor device of this kind, the steering column module has an extended functionality.

In particular, the sensor device can be designed to detect a torque applied to the steering shaft when turning a steering handle, such as a steering wheel of the steering column for example. This information can be used, in particular, to provide motor assistance when operating the steering handle.

In addition or as an alternative, the sensor device can be designed to detect a steering angle. Owing to the provision of the sensor device, the function of a torque sensor and/or a steering angle sensor can therefore be integrated in the steering column module. The possibility of detecting a steering angle is also advantageous with regard to providing an extended functionality of the steering column module.

A gap is preferably formed between an end wall region of one of the two housing parts and an end wall region, which is situated opposite this end wall region in the direction of the rotation axis, of the other of the two housing parts in the transportation state, the gap being covered by the adhesive seal at least in regions in the radial direction. The provision of an axial distance of this kind between the housing parts in the end wall regions facing one another assists the continued movement of the free edge of one of the subregions of the adhesive seal from the free edge of the other subregion of the adhesive seal as a result of the tearing or the separation of the adhesive seal. This is because the edges of the two subregions of the adhesive seal can move away from one another more easily in the radial direction where such an axial gap is formed.

The gap preferably comprises a first gap region and a second gap region. Here, the second gap region is closer to the rotation axis than the first gap region, and the gap is narrower in the second gap region than in the first gap region. This ensures that the first gap region, which is wider in the direction of the rotation axis, is formed only in the immediate vicinity of the adhesive seal. Consequently, the housing part has a high degree of robustness despite the provision of the comparatively wide first gap region. Such a configuration of the gap can be provided in particular by way of a step being formed or provided close to the outer side of one of the two housing parts.

A surface of the adhesive seal, which surface faces an observer, preferably has a color and/or a surface structure and/or a pattern which provide/provides the adhesive seal with better visual differentiation from at least one of the housing parts than without the provision of the color and/or the surface structure and/or the pattern. This increases the ability to identify damage or the separation of the adhesive seal.

For example, the outer surface of the adhesive seal, which outer surface faces the observer, can have a darker color than a material of the at least one housing part. For example, if an adhesive seal with a black surface is provided in front of a, for example, white plastic surface of the at least one housing part, the adhesive seal can be visually distinguished particularly well from the housing part situated behind it. This applies in an analogous manner if the surface of the adhesive seal has the surface structure or the pattern, for example in the form of hatching or the like.

In the method according to the invention for checking a steering column module according to the invention for integrity of the adhesive seal, it is determined whether the adhesive seal is separated into the two subregions. If this is the case, it can be concluded that the steering column module has been manipulated after it has been manufactured and after the adhesive seal has been attached to the steering column module. If the check reveals that the adhesive seal is intact, it can however be assumed that a manipulation of this kind has not taken place.

Consequently, by way of checking the steering column module for the integrity of the adhesive seal, it is very easy to determine whether the two housing parts of the steering column module are arranged with the correct orientation relative to one another.

A camera is preferably used to determine whether the adhesive seal is separated into the two subregions. In this way, this determination can be made with particularly little effort, cost-effectively and reliably.

In particular, at least one image recorded by the camera can be evaluated by means of an evaluation device for the determination. As a result, the checking of the steering column module for the integrity of the adhesive seal is advantageously automated to a particularly great extent.

Finally, it has proven to be advantageous if the camera is oriented in such a way that an optical axis of the camera encloses an acute angle with the rotation axis. This is because, owing to orientation of the camera in this way, the protrusion of the free edge of one of the subregions of the adhesive seal in the radial direction over the free edge of the other subregion of the adhesive seal can be detected very readily and reliably.

The advantages and preferred embodiments described for the steering column module according to the invention also apply to the method according to the invention, and vice versa.

The features and combinations of features mentioned above in the description and the features and combinations of features mentioned below in the description of the figures and/or shown in the figures alone may be used not only in the respectively indicated combination but also in other combinations without departing from the scope of the invention. The invention is therefore also intended to be considered to comprise and disclose embodiments that are not explicitly shown and explained in the figures but that result and can be generated from the explained embodiments, by way of separate combinations of features. Embodiments and combinations of features that therefore do not have all the features of an originally formulated independent claim should also be regarded as disclosed. Furthermore, embodiments and combinations of features, in particular by way of the embodiments outlined above, that go beyond or deviate from the combinations of features outlined in the back references of the claims should be regarded as disclosed.

Further features of the invention can be gathered from the claims, the figures and the description of the figures, in which:

Figure 3:
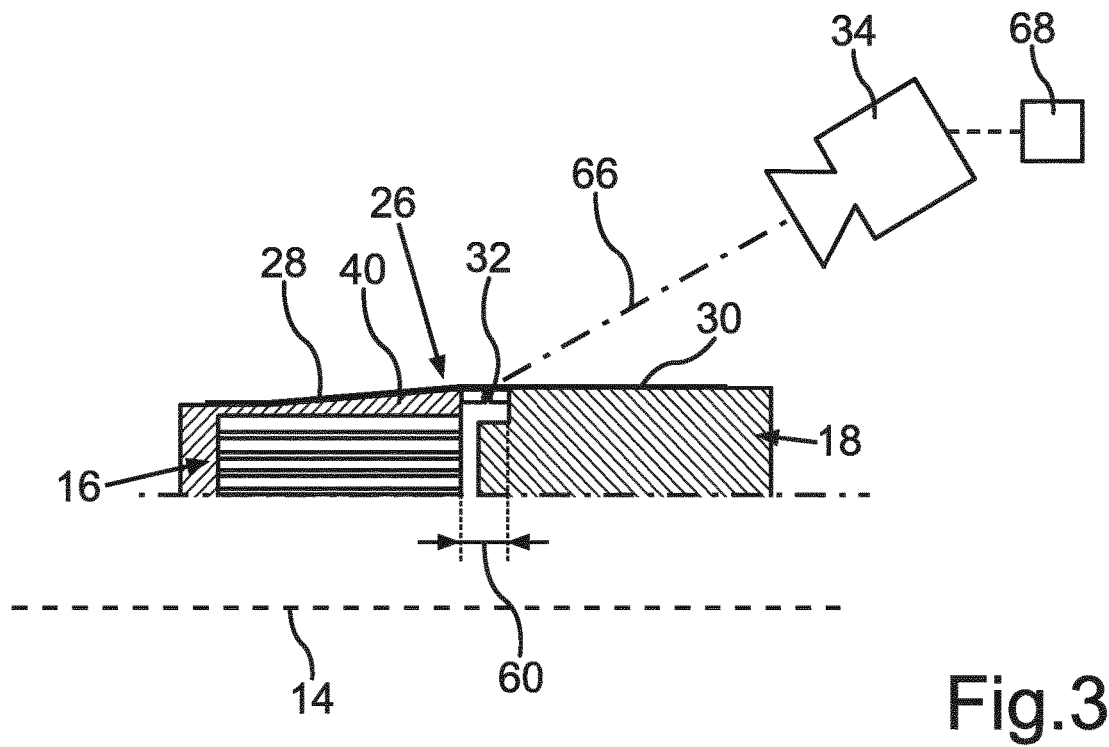
FIG. 3 shows a schematic sectional view and details of the two housing parts, which are latched to one another, with the adhesive seal intact.
Figure 6:
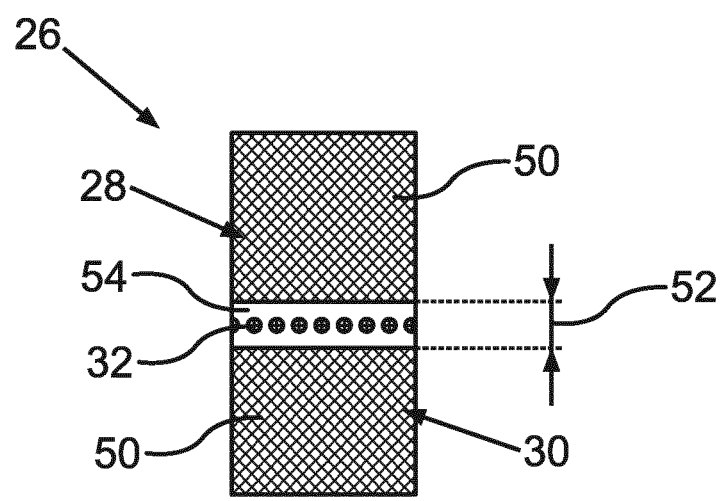
Figure 7:
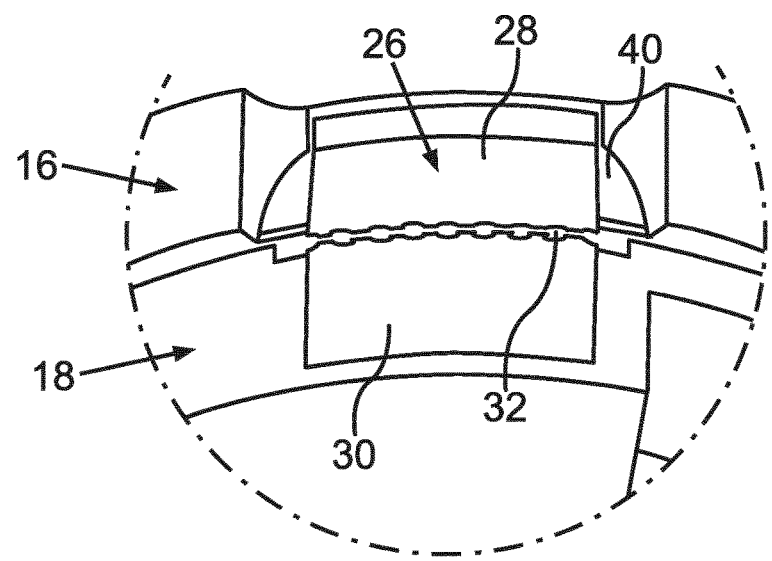
Figure 8:
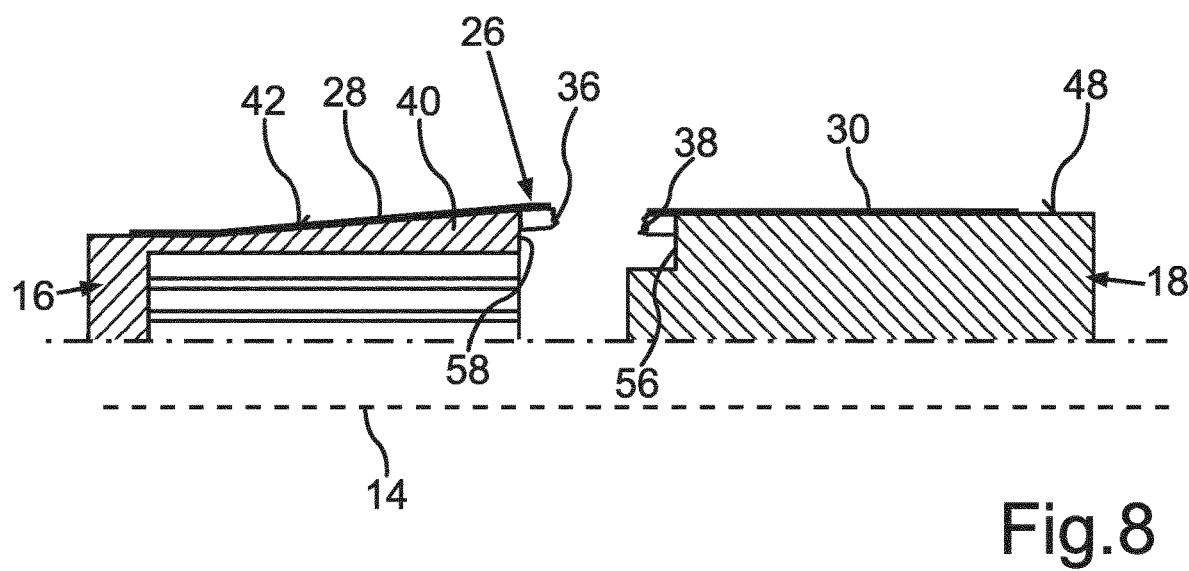

FIG. 6 schematically shows the adhesive seal in a plan view of an bottom side of the same provided with adhesive;

FIG. 7 shows a schematic perspective view of the broken adhesive seal in the direction of a viewing axis of a camera shown in FIG. 3; and FIG. 8 shows a schematic sectional view and details of the two housing parts in their installation position, with the adhesive seal being separated into the two subregions.

Elements that are the same or have the same function are provided with identical reference signs in the figures.

Figure 1:
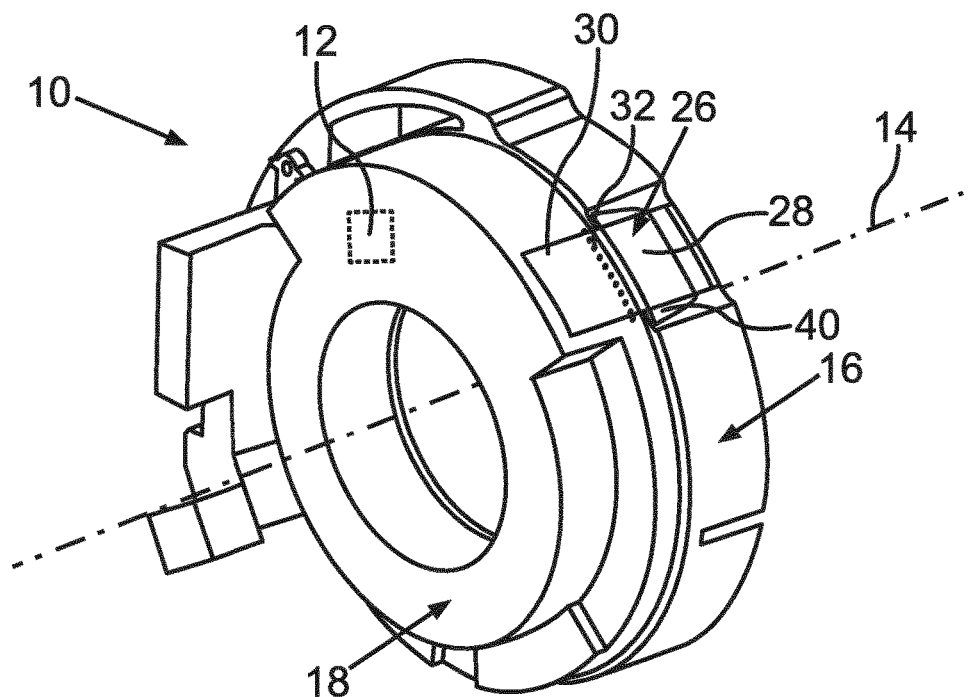
FIG. 1 shows a schematic perspective view of a steering column module comprising two housing parts in a delivery state or transportation state, in which the two housing parts are latched to one another, with an adhesive seal being attached to the housing parts which are latched to one another.

FIG. 1 shows a schematic perspective view of a steering column module 10 which can be attached to a steering column (not shown) of a motor vehicle. In this context, the steering column module 10 can comprise, in particular, a sensor device 12, shown merely schematically in the present case, which makes it possible to detect a torque applied to a steering shaft (not shown) of the steering column and/or a steering angle, that is to say an angle through which the steering shaft is rotated around a rotation axis 14 starting from a straight position of steerable wheels of the motor vehicle. The rotation axis 14 of the steering column module 10 is illustrated in FIG. 1 and corresponds substantially to a direction of longitudinal extent of the steering shaft (not shown) of the steering column.

The steering column module 10 comprises a first, in the present case substantially ring-shaped, housing part 16 and a second, in the present case likewise substantially ring-shaped, housing part 18. FIG. 1 shows the steering column module 10 in a transportation state or delivery state, in which the two housing parts 16, 18 are coupled to one another in a rotationally fixed manner. In the present case, the two housing parts 16, 18 are latched to one another in a rotationally fixed manner in the delivery state or transportation state.

Figure 2:
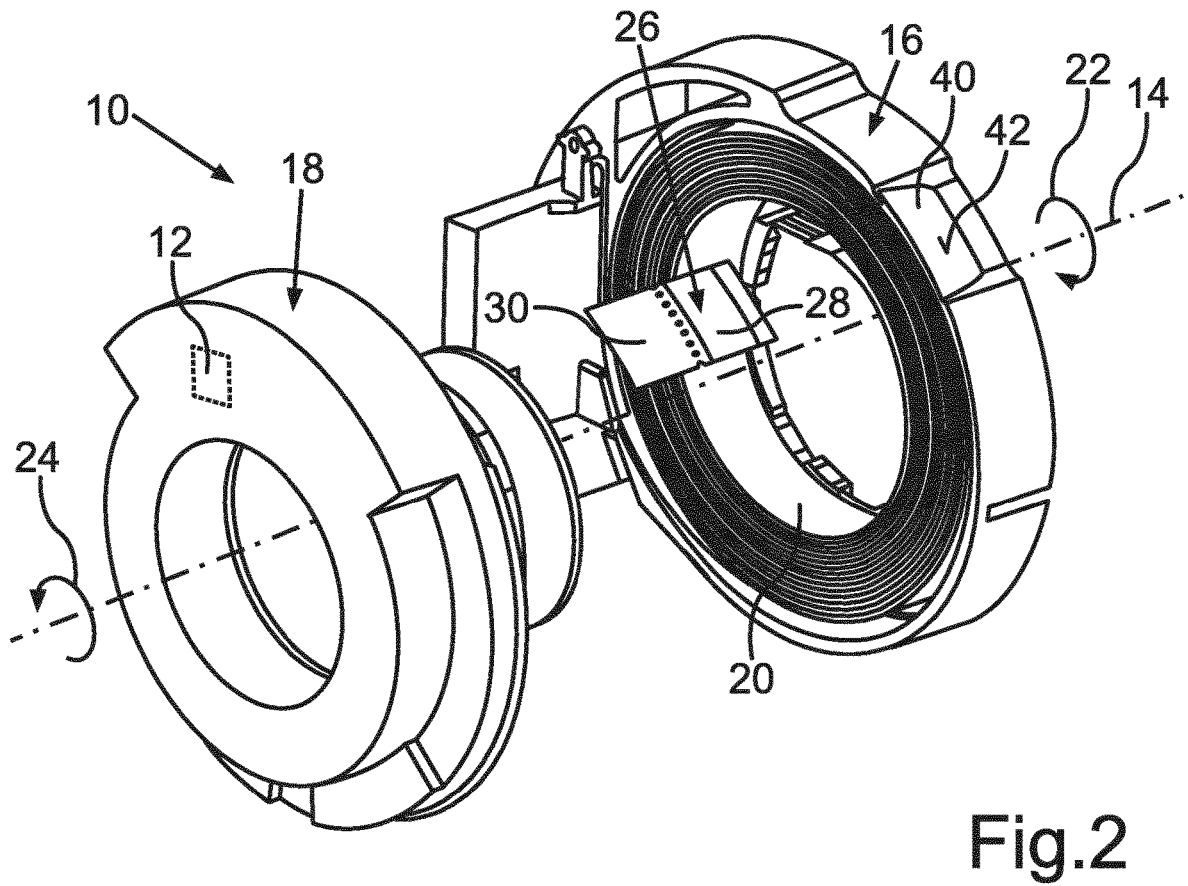
FIG. 2 shows an exploded illustration of the steering column module according to FIG. 1.

FIG. 2 shows the two housing parts 16, 18 of the steering column module 10 in a state in which they are separated from one another. In the installation state of the steering column module 10, in which the steering column module 10 is attached to the steering column of the motor vehicle, the first housing part 16 can be attached in a rotationally fixed manner or stationary manner to a component of the steering column, for example to a casing of the steering column. In contrast, the second housing part 18 is then fixed to the steering shaft, which is rotatable around the rotation axis 14 within the casing of the steering column. A rotational movement around the rotation axis 14 applied to the steering shaft by means of a steering handle, such as a steering wheel for example, then also leads to a rotation of the second housing part 18 relative to the first housing part 16 around the rotation axis 14.

The exploded illustration in FIG. 2 shows that an electrical line is arranged in a manner wound spirally around the rotation axis 14 in the steering column module 10. In the present case, the electrical line is designed as a ribbon cable 20. The ribbon cable 20 is coupled or connected both to the first housing part 16 and to the second housing part 18 in the installation position of the steering column module 10 and also in the transportation state or delivery state of the steering column module 10.

At least one electrical device of the steering column can be supplied with electrical energy via the ribbon cable 20, for example a controller and/or an airbag device integrated, for example, into the steering handle and/or at least one operator control element or the like integrated into the steering handle.

In the present case, the ribbon cable 20 is received in a spirally wound manner in a receiving space of the steering column module 10, which receiving space is delimited toward the outside or in the radial direction by the first housing part 16. However, in principle, it is also possible in the case of the steering column module 10 to accommodate the ribbon cable 20 spirally wound around the rotation axis 14 or the windings of this ribbon cable 20 within a receiving space provided by the second housing part 18.

The many windings of the spirally wound ribbon cable 20 allow the second housing part 18 to be rotated by at least one complete revolution, that is to say through at least 360°, in a first direction 22 around the rotation axis 14 of the steering column module 10, which is illustrated by a curved arrow in FIG. 2, in a desired installation position of the steering column module 10 in which the steering column module 10 is attached to the steering column of the motor vehicle. Furthermore, the second housing part 18 can also be rotated out of the starting position in relation to the first housing part 16 by at least one complete revolution, that is to say through at least 360°, in a second direction 24 around the rotation axis 14 of the steering column module 10, which is likewise illustrated by a curved arrow in FIG. 2, in this desired installation position of the steering column module 10. The second direction 24 is opposite to the first direction 22 according to the illustration in FIG. 2.

In particular, the number of windings of the ribbon cable 20 in conjunction with the spiral arrangement of the ribbon cable 20 in the steering column module 10 can allow, starting from the starting position of the second housing part 18, the second housing part 18 to be rotated through an angle of rotation of approximately 600° to approximately 800° in the first direction 22 and likewise by a substantially equal angle of rotation of approximately 600° to approximately 800° in the second direction 24, while the first housing part 16 remains stationary, in the desired installation position of the steering column module 10.

During the manufacture of the steering column module 10 and the subsequent movement of the steering column module 10 to the transportation state or delivery state, which is shown in FIG. 1, efforts are therefore made to ensure that the two housing parts 16, 18 are in a correct orientation, which corresponds to the desired installation position, relative to one another. If the two housing parts 16, 18 of the steering column module 10 that has been inspected and found to be in order have this correct orientation relative to one another, the two housing parts 16, 18 are connected to one another in a rotationally fixed manner, in the present case by latching the two housing parts 16, 18 to one another.

An adhesive seal 26 is then attached to the steering column module 10 (compare FIG. 1). This is done in such a way that a first subregion 28 of the adhesive seal 26 is connected to the first housing part 16 and a second subregion 30 of the adhesive seal 26 is connected to the second housing part 18 (compare FIG. 1). The adhesive seal 26 or film seal here indicates that the two housing parts 16, 18 are in the correct orientation, which corresponds to the desired installation position, relative to one another. This ensures that the ribbon cable 20 is also in the starting position or middle position, in which the second housing part 18 can be rotated relative to the first housing part 16 through approximately the same angle of rotation in the first direction 22 and in the second direction 24.

It may now be the case that after manufacture and testing of the steering column module 10, housing parts 16, 18 which are latched to one another are separated from one another again, with the latching being opened or released. This also leads to tearing or separation of the adhesive seal 26 along a predetermined breaking line of the adhesive seal 26, which is designed as a perforation line 32 in the present case. It may be the case that, after such breaking or tearing or separation of the adhesive seal 26 into the subregions 28, 30, the two housing parts 16, 18 are coupled or latched to one another again such that the subregions 28, 30 of the adhesive seal 26 are situated exactly opposite one another in the direction of the rotation axis 14.

If, however, the second housing part 18 has been rotated here by exactly one complete revolution from the starting position in the first direction 22 (or in the second direction 24) in relation to the first housing part 16 before the two housing parts 16, 18 are latched to one another again, the ribbon cable 20 is no longer in the desired middle position, which corresponds to the correct orientation of the two housing parts 16, 18 relative to one another. The correct orientation of the two housing parts 16, 18 relative to one another is that orientation which the two housing parts 16, 18 have relative to one another in the desired installation position of the steering column module 10. If in such a case, that is to say after the second housing part 18 has been inadvertently rotated by a complete revolution, the separation of the adhesive seal 26 is not identified and the steering column module 10 is mounted on the steering column of the motor vehicle in this state, the second housing part 18 can no longer be rotated or turned relative to the first housing part 16 through equal angular amounts in the respective directions 22, 24.

It is therefore desirable if a broken adhesive seal 26, that is to say the separation of the adhesive seal 26 into the two subregions 28, 30, can be identified in a simple and reliable manner. This is because the torn adhesive seal 26 indicates an unintended manipulation of the steering column module 10 after it has been checked and sealed, that is to say after the adhesive seal 26 has been attached to the two housing parts 16, 18.

However, it has proven to be comparatively difficult to detect damage to the adhesive seal 26 by means of a camera 34 (compare FIG. 3). The latter can be the case in particular when tear lines of the two halves or subregions 28, 30 of the adhesive seal 26 are so close to one another in the radial direction that the presence of a tear or the presence of the separation of the adhesive seal 26 cannot be identified by means of the camera 34.

In the present case, however, the steering column module 10 is designed in such a way that the ability to identify a torn film seal or adhesive seal 26 will be or is improved.

For this purpose, provision is made for a contrast that can be identified by means of the camera 34 to be particularly high in the region of a possible tear in the adhesive seal 26. In order to achieve this, the configuration of the steering column module 10 ensures that there is a comparatively large radial distance between the subregions 28, 30 of the adhesive seal 26 along the tear line, that is to say in the present case along the perforation line 32, when the adhesive seal 26 is torn.

And because the steering column module 10 shown in the present case ensures that, if the adhesive seal 26 or foil seal tears, the two subregions 28, 30 are at a large distance from one another in the radial direction, the adhesive seal 26 can be separated into the two subregions 28, 30 and therefore a possible manipulation with regard to the orientation of the two housing parts 16, 18 relative to one another can be readily identified by means of the camera 34.

The measures explained below to increase the ability to identify the torn adhesive seal 26 are based on the finding that it is difficult to identify a tear in the adhesive seal 26 when the adhesive seal 26 is adhesively bonded in a common plane over the two housing parts 16, 18 or assemblies of the steering column module 10. This is because, if the adhesive seal 26 is torn, then the two opposite ends of the subregions 28, 30 are likewise in the same plane, without the subregions 28, 30 being at a radial distance from one another.

In the present case, however, means are formed on at least one of the two housing parts 16, 18 which, when the adhesive seal 26 is separated into the two subregions 28, 30, cause a free edge 36 of one of the subregions 28, 30, in the present case the subregion 28 for example (compare FIG. 5), to protrude over a free edge 38 of the other subregion 30.

Figure 4:
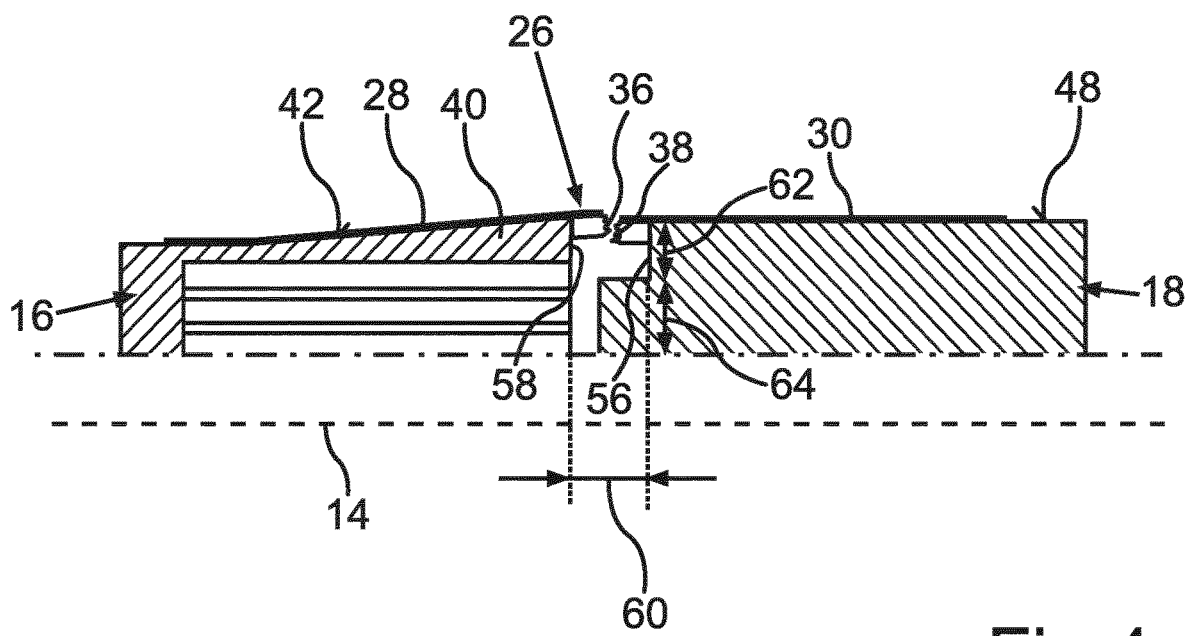
FIG. 4 shows an enlarged view of the details of the housing parts according to FIG. 3, with the adhesive seal being separated.
Figure 5:
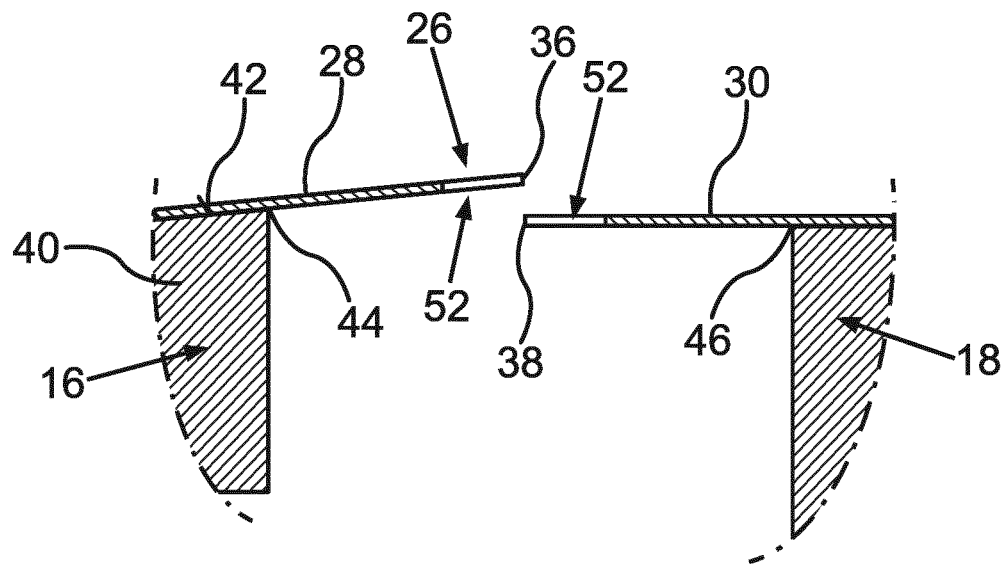
FIG. 5 shows a greatly enlarged and schematic view of a detail of the torn adhesive seal or adhesive seal separated into two subregions in the region where it is attached to the two housing parts according to FIG. 4.

In FIG. 5, this protrusion of the free edge 36 of the first subregion 28, which is adhesively bonded to the first housing part 16 in the present case, over the free edge 38 of the second subregion 30, which is adhesively bonded to the second housing part 18 in the present case, is illustrated in a highly schematic and greatly enlarged manner. In fact, this protrusion of the free edge 36 over the free edge 38 is comparatively small, as can be seen more clearly from the likewise schematic illustration in FIG. 4.

The corresponding means, which cause this protrusion of the free edge 36 over the free edge 38 when the adhesive seal 26 is separated into the two subregions 28, 30, comprise a plurality of measures in the steering column module 10 shown in FIG. 1. On the one hand, a ramp 40 is formed on one of the two housing parts 16, 18, in the present case on the first housing part 16, in the region of the adhesive seal 26 (compare FIGS. 1 and 2).

As shown in particular by a combination of FIG. 1 and FIG. 4, the first subregion 28 of the adhesive seal 26 is in contact with a top side 42 of the ramp 40. Furthermore, FIG. 3 and FIG. 4 in particular show that the top side 42 of the ramp 40 is oriented in a manner inclined in relation to the rotation axis 14. In the configuration shown by way of example in the present case, the ramp 40 is inclined in relation to the rotation axis 14 here in such a way that a free end 44 of the ramp 40 (compare FIG. 5) protrudes outward over an edge 46 of the other housing part 18 in the radial direction (compare FIG. 5). Accordingly, an outer side of the first housing part 16 also protrudes over an outer side 48 of the second housing part 18 in the radial direction in the region of the adhesive seal 26 (compare FIG. 4).

In a variant (not shown in the present case) of the steering column module 10, the ramp can also be inclined in such a way that the free end 44 of the ramp 40 is closer to the rotation axis 14 than the edge 46 of the second housing part 18.

In the present case, the provision of the ramp 40 ensures that there is a radial height difference between the two housing parts 16, 18 in the region of the perforation line 32 of the adhesive seal 26. Furthermore, the ramp 40 advantageously ensures that the first subregion 28 of the adhesive seal 26 attached to the top side 42 of the ramp 40 continues at an angle which is enclosed by the surface or top side 42 of the ramp 40 and the rotation axis 14 when the adhesive seal 26 is torn (compare FIG. 4). Accordingly, the distance between the free edges 36, 38 in height or the distance between the two subregions 28, in the radial direction is increased again. This is also due to the fact that the adhesive seal 26 or film seal formed in the present case by a film 54 coated in regions with an adhesive 50 (compare FIG. 6) has a certain inherent rigidity, which leads to such straightening of the subregion 28.

The lifting off of the first subregion 28 of the adhesive seal 26 at the free edge 36 of the subregion 28 and therefore the protrusion of the free edge 36 over the free edge 38 (compare FIG. 5) of the other subregion 30 is preferably also assisted by way of the adhesive seal 26 not being adhesively bonded in the region of the perforation line 32, that is to say the film 54 not being coated with the adhesive 50.

This is clearly shown in the plan view shown in FIG. 6 of a bottom side of the adhesive seal 26, that is to say of the side of the adhesive seal 26 which faces the housing parts 16, 18. Accordingly, a main body of the adhesive seal 26, which main body is provided by the film 54 in the present case, is free of the adhesive 50 in a section 52 of the respective subregion 28, 30 which adjoins the perforation line 32. The sections 52 of the adhesive seal 26 which are free of the adhesive 50 in the region of the perforation line 32 can also be seen in FIG. 5.

In particular, it is advantageous if the adhesive seal 26 is not adhesively bonded or coated with the adhesive 50 in the region of the housing part 18 that is straight on the outer side 48, that is to say where the second housing part 18 has the outer side 48 parallel to the rotation axis 14 (compare FIG. 4). However, as shown in FIG. 5, the section 52 of the first subregion 28, which section adjoins the free edge 36, can also be free of the adhesive 50.

The improved ability to identify the torn film seal or adhesive seal 26 is also assisted in the present case by way of a gap 60 being formed between an end wall region 56 of the second housing part 18 and an end wall region 58, which is situated opposite this end wall region 56 in the direction of the rotation axis 14, of the first housing part 16 (compare FIG. 3 and FIG. 4). In the present case, this gap 60 is covered by the adhesive seal 26 in the radial direction.

As can be seen from a combination of FIG. 3 and FIG. 4, the gap 60 has a first gap region 62 and a second gap region 64 in the present case. The second gap region 64 is closer to the rotation axis 14 than the first gap region 62. Furthermore, the gap 60 is narrower in the second gap region 64 than in the first gap region 62. The provision of the comparatively large distance between the end wall regions 56, 58 in the first gap region 62 assists the movement of the subregions 28, 30 of the torn adhesive seal 26 away from one another in the radial direction in the present case. In addition, this ensures an improved ability to identify the torn film seal or adhesive seal 26.

FIG. 3 shows how the camera 34 can be used when checking the steering column module 10 for integrity of the adhesive seal 26. In this case, the camera 34 is oriented in such a way that an optical axis 66 of the camera 34 encloses an acute angle with the rotation axis 14. In the present case, this angle is advantageously open toward the same side as an angle which is enclosed by the top side 42 of the ramp 40 and the rotation axis 14. This is because the camera 34 can detect the separation of the adhesive seal 26 particularly well.

Accordingly, FIG. 7 shows how the adhesive seal 26 torn at the perforation line 32 appears from the viewing direction of the camera 34. Consequently, an image recorded by the camera 34 can be evaluated very easily, in particular by means of an evaluation device 68 schematically shown in FIG. 3, to determine whether the adhesive seal 26 is intact or, as shown in FIG. 7, is separated along the perforation line 32 into the two subregions 28, 30.

FIG. 8 schematically shows details of the two housing parts 16, 18 in the desired installation position of the steering column module 10. Accordingly, the two housing parts 16, 18 are spaced further apart from one another in the direction of the rotation axis 14 than in the transportation state or delivery state, which is shown in FIG. 1 and in FIG. 4. Consequently, the adhesive seal 26 is also torn in this installation state of the steering column module 10.

Overall, the examples show how, for an optical inspection system that uses the camera 34, an increased ability to identify a tear in the adhesive seal 26 can be achieved by increasing a radial distance between the free edges 36, 38 of the subregions 28, 30 of the adhesive seal 26. This also applies in the event that the two housing parts 16, 18 are still in the transportation state or delivery state, in which the two housing parts 16, 18 are connected to one another or latched to one another in a rotationally fixed manner.

This is because the radial distance between the free edges 36, 38 of the subregions 28, of the adhesive seal 26 (compare FIG. 5) ensures that the change in contour along the tear line or perforation line 32 is readily identifiable. The tear in the adhesive film or the adhesive seal 26 stands out particularly clearly from the background of the housing part 16 situated behind it (compare FIG. 7).

Consequently, in the case of the steering column module 10 shown in the present case, a camera-based inspection for integrity of the adhesive seal 26 can be implemented in a particularly simple manner.

The invention claimed is:

1. A steering column module for attachment to a steering column of a motor vehicle, comprising:
   a first housing part;
   a second housing part which, in a desired installation position of the steering column module, in which the steering column module is attached to the steering column, is rotatable around a rotation axis of the steering column module from a starting position in relation to the first housing part by at least one complete revolution both in a first direction and in a second direction opposite to the first direction; and
   an electrical line which is coupled to both housing parts and is received in the steering column module in a manner wound spirally around the rotation axis,
   wherein the steering column module has an adhesive seal for identifying correct orientation, which corresponds to the desired installation position, of the two housing parts relative to one another, wherein a first subregion of the adhesive seal is connected to the first housing part and a second subregion of the adhesive seal is connected to the second housing part,
   wherein the adhesive seal has a predetermined breaking line along which the adhesive seal can be separated into the two subregions, wherein a section, which adjoins the predetermined breaking line, of at least one of the subregions is free of an adhesive, by which the respective subregion of the adhesive seal is held on the corresponding housing part, and
   wherein means are formed on at least one of the two housing parts, the means causing a free edge of one of the subregions to protrude over a free edge of the other subregion in a radial direction when the adhesive seal is separated into the two subregions.

2. The steering column module as claimed in claim 1, wherein the means are provided by way of an outer side of one of the two housing parts protruding over an outer side of the other of the two housing parts in the radial direction at least in the region of one of the free edges of the adhesive seal.

3. The steering column module as claimed in claim 1, wherein the means are provided by a ramp which is formed on one of the two housing parts at least in the region of the adhesive seal, wherein one of the subregions of the adhesive seal is in contact with a top side of the ramp, which top side is oriented in a manner inclined with respect to the rotation axis.

4. The steering column module as claimed in claim 3, wherein a free end of the ramp protrudes outward over an edge of the other of the two housing parts in the radial direction, or a free end of the ramp is closer to the rotation axis than an edge of the other of the two housing parts.

5. The steering column module as claimed in claim 1, wherein the two housing parts are coupled and latched to one another in a rotationally fixed manner, in a transportation state of the steering column module, in which a distance between the housing parts in the direction of the rotation axis is smaller than in the desired installation position of the steering column module, the steering column module comprising a sensor device for detecting rotation of a steering shaft of the steering column around the rotation axis.

6. The steering column module as claimed in claim 5, wherein a gap, which is covered by the adhesive seal at least in regions in the radial direction, is formed between an end wall region of one of the two housing parts and an end wall region, which is situated opposite this end wall region in the direction of the rotation axis, of the other of the two housing parts in the transportation state.

7. The steering column module as claimed in claim 6, wherein the gap comprises a first gap region and a second gap region, wherein the second gap region is closer to the rotation axis than the first gap region, and wherein the gap in the second gap region is narrower than in the first gap region.

8. The steering column module as claimed in claim 1, wherein a surface of the adhesive seal that faces an observer has a color and/or a surface structure and/or a pattern which visually differentiates the adhesive seal from at least one of the housing parts.

9. A method for checking the steering column module as claimed in claim 1 for integrity of the adhesive seal, the method comprising:
   determining whether the adhesive seal is separated into the two subregions.

10. The method as claimed in claim 9, wherein an optical inspection system comprising a camera is used for determining whether the adhesive seal is separated into the two subregions, and wherein at least one image recorded by the camera is used in the determination.

11. The method as claimed in claim 10, wherein the camera is oriented in such a way that an optical axis of the camera encloses an acute angle with the rotation axis.

12. A steering column module for attachment to a steering column of a motor vehicle, comprising:
   a first housing part;
   a second housing part which, in a desired installation position of the steering column module, in which the steering column module is attached to the steering column, is rotatable around a rotation axis of the steering column module from a starting position in relation to the first housing part by at least one complete revolution both in a first direction and in a second direction opposite to the first direction;
   an electrical line which is coupled to both housing parts and is received in the steering column module in a manner wound spirally around the rotation axis; and
   an adhesive seal for identifying correct orientation, which corresponds to the desired installation position of the two housing parts relative to one another, wherein a first subregion of the adhesive seal is connected to the first housing part and a second subregion of the adhesive seal is connected to the second housing part,
   wherein means are formed on at least one of the two housing parts, the means causing a free edge of one of the subregions to protrude over a free edge of the other subregion in a radial direction when the adhesive seal is separated into the two subregions, and
   wherein the two housing parts are coupled and latched to one another in a rotationally fixed manner, in a transportation state of the steering column module, in which a distance between the housing parts in the direction of the rotation axis is smaller than in the desired installation position of the steering column module,
   the steering column module comprising a sensor device for detecting rotation of a steering shaft of the steering column around the rotation axis.

* * * * *